July 19, 1938.  F. M. SMITH  2,124,087
SHOCK STRUT
Filed Nov. 18, 1935  2 Sheets-Sheet 1
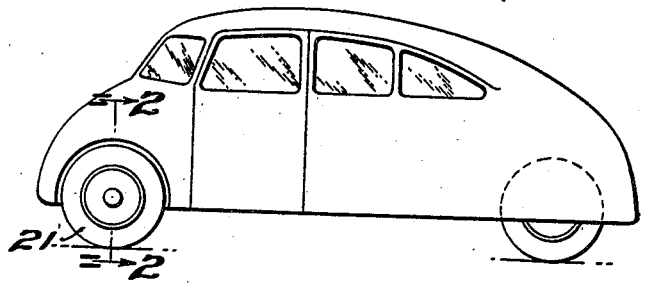
FIG. 1.
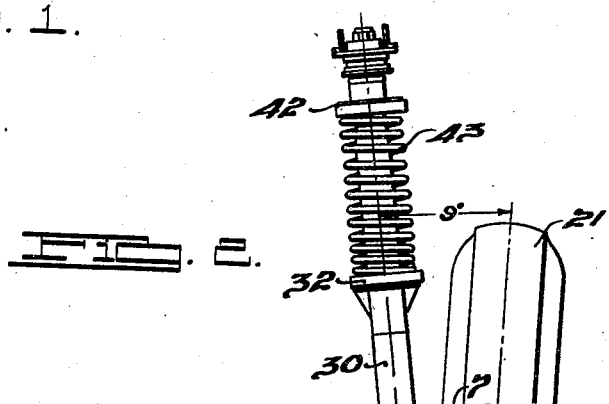
FIG. 2.
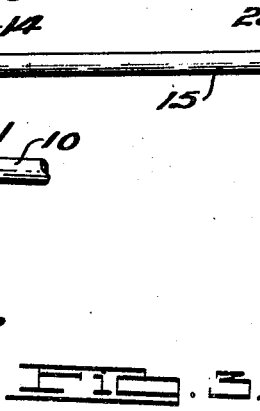
FIG. 3.
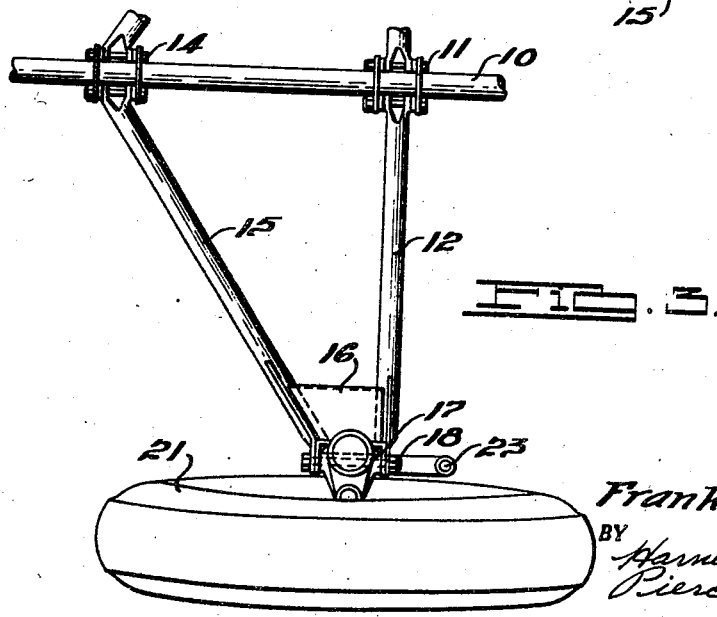
INVENTOR.
Frank M. Smith.
BY Harness, Dickey, Pierce & Hann.
ATTORNEYS.

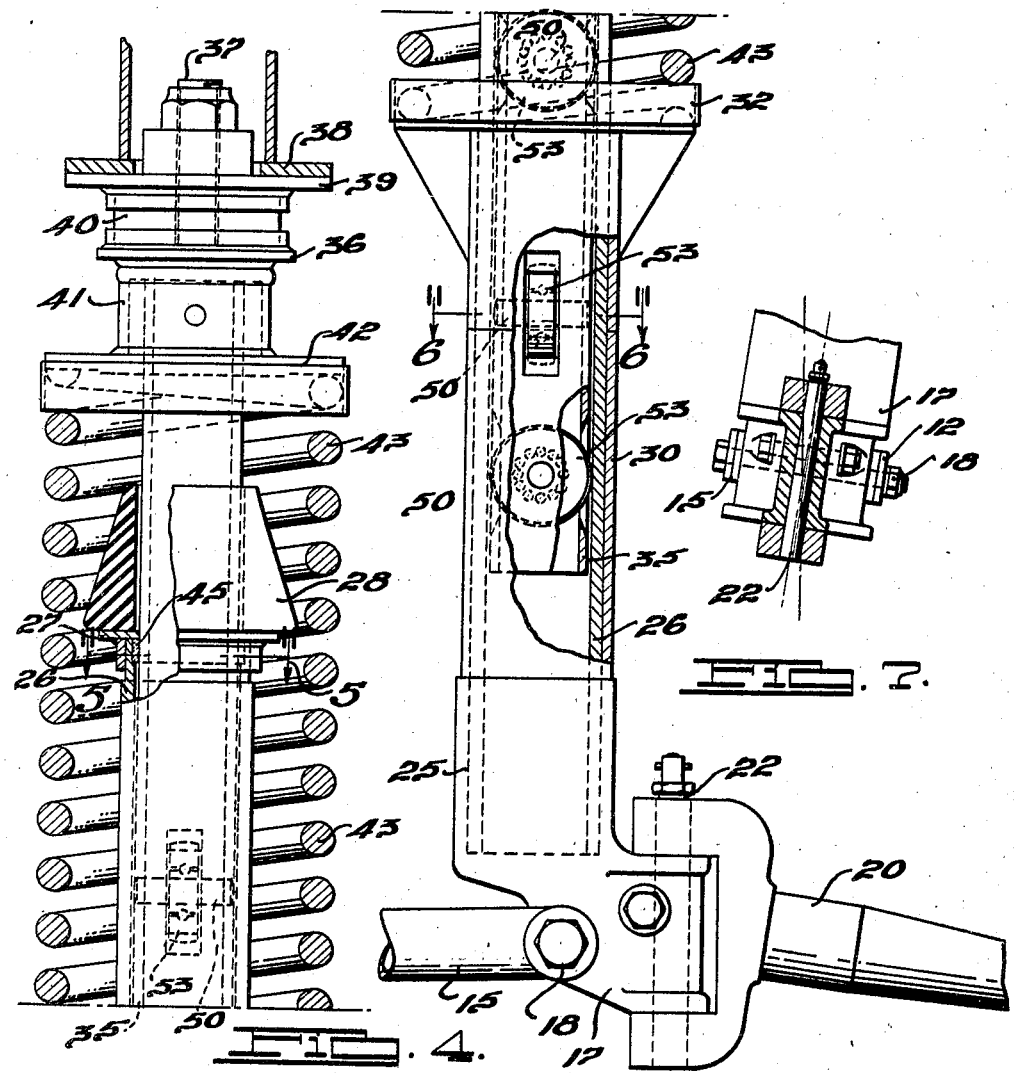
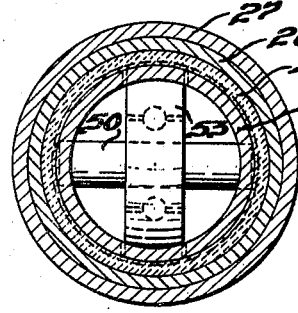
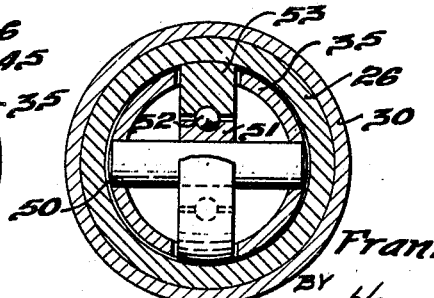
INVENTOR.
Frank M. Smith.
BY Harness, Dickey Pierce & Hann.
ATTORNEYS.

Patented July 19, 1938

2,124,087

UNITED STATES PATENT OFFICE 2,124,087

SHOCK STRUT

Frank M. Smith, Dearborn, Mich., assignor, by mesne assignments, to Stout Motor Car Corporation, Dearborn, Mich., a corporation of Delaware Application November 18, 1935, Serial No. 50,302

8 Claims. (Cl. 267—20)

This invention relates to shock struts. More particularly, it relates to a shock strut which is adapted for use in independent suspensions of vehicle wheels.

It is a primary object of this invention to provide a shock strut construction, the operation of which is not materially affected by the subjection thereto of substantial bending stresses.

Shock struts generally, comprise a pair of substantially cylindrical telescoping tubular members. One of these members is generally attached to a rigid support and the other attached to a wheel or other element which is movably mounted with respect to the support. Resilient means are usually associated with the telescoping tubular members in order that the relative movement thereof may be resiliently controlled. Shock struts of this general character have found marked utility in the mounting of aeroplane wheels and in many other fields. Heretofore, it has been necessary, however, to use shock struts of this general category only in installations where the strut structure is effectually protected against any bending stresses, or any forces other than those exerted axially of the telescoping members. Such transverse stresses have been found to increase the frictional engagement of the telescoping members to such an extent that the operation of the strut is materially impaired.

It is therefore the general object of the present invention to provide a shock strut construction which will operate efficiently irrespective of bending or transverse stresses applied thereto.

The shock strut of the present invention is, due to its construction, particularly adaptable for use in independent suspensions of vehicle wheels. However, it will be apparent from the following specification that the specific embodiment of the present invention described, although being particularly adaptable for automotive use, will find wide application and great utility in many and various other fields.

It is a further object of the present invention to provide a shock strut of relatively simple construction which will be exceedingly strong and which will have the working parts thereof effectively protected from foreign matter in order that the effective life of the strut as a whole will be materially increased.

Yet another object of the present invention consists in the provision of novel means for mounting the shock strut, whereby one of the telescoping members is resiliently secured to the support on which it is mounted.

Still further, the present invention contemplates the provision of novel means for resiliently limiting the telescoping movement of the members forming the strut with respect to each other. This means may comprise a resilient cushion mounted on the terminal end of one of the telescoping members and annularly surrounding the other member. A complemental abutment is arranged and carried by one of the members adapted to engage this resilient cushioning means in order to provide a resilient but effective limit to relative telescoping movement of the members.

Many other and further objects and advantages of the present invention will become apparent from the following specification when considered in connection with the accompanying drawings, forming a part thereof.

In the drawings,

Figure 1 illustrates an automotive vehicle of the type particularly adaptable for utilization of shock struts of the present invention.

Figure 2 is an enlarged fragmentary vertical section taken on the line 2—2 of Figure 1, showing the manner in which one of the improved shock struts is used for resiliently mounting one of the front wheels of the vehicle.

Figure 3 is a plan view of the wheel suspension illustrated in Figure 2.

Figure 4 is an enlarged detailed view partly in section of a shock strut embodying the improvements of the present invention.

Figure 5 is a transverse sectional view taken on the line 5—5 of Figure 4 showing in detail the telescoping arrangement of the various tubular members making up the shock strut and the mounting of one of the rollers therein.

Figure 6 is a transverse sectional view taken on the line 6—6 of Figure 4 showing in detail the manner in which the roller elements are journaled within the inner of the cylindrical members, and Figure 7 is a sectional view taken on the line 7—7 of Figure 2 illustrating the pivotal mounting of one of the front wheels.

With more particular reference to the drawings, the specific embodiment of the invention disclosed therein illustrates in detail one particularly satisfactory use for shock struts of the present invention. While Figures 2 and 3 of the drawings illustrate the improved shock strut used for providing independent suspension for one of the front wheels of an automotive vehicle, it will be appreciated that the invention may be satisfactorily used for the mounting of driven wheels as well as many other specific uses.

The frame of the vehicle has, extending longitudinally thereof, in its central portion a tubular frame member 10. This frame member 10 has secured thereto a bracket 11 in which a front axle 12 is pivotally mounted for arcuate movement in a vertical plane. Substantially forwardly of the bracket 11 on the frame member 10 is mounted a second bracket 14 in which is pivotally mounted a radius rod 15 which is likewise pivoted for vertical movement. The outer end portions of the axle 12 and radius rod 15 are secured together by means of a gusset plate 16 and have both their ends secured to a forging 17 by means of a suitable transverse bolt 18.

This forging 17 is provided with a bore therethrough which provides means for mounting a conventional stub axle 20 on which is mounted a conventional front wheel 21. This stub axle 20 is mounted in the forging 17 by means of a conventional king pin 22 and preferably integrally formed therewith has a steering arm 23 such as is conventional in the art.

The upper portion of the forging 17 is preformed to provide a socket 25 which serves to receive and mount the lower end of the improved shock strut of the present invention. This socket 25 is adapted to receive, and has mounted therein a cylindrical tubular member 26 which forms one of the primary elements of the shock strut construction hereinafter described. The tubular member 26 is preferably permanently secured within the socket 25 and extends upwardly therefrom in a direction preferably substantially tangential to the arc of the circle described by the movement of the axle 12 about its pivot on the body frame.

The extreme upper end of the tubular member 26 is preferably of slightly reduced diameter and has a collar 27 permanently secured thereto which serves to provide a seat for an annular frustoconical resilient stop member 28, the purpose and function of which will hereinafter become clear. Closely surrounding the tubular member 26 at the base portion thereof is a short telescoping tubular member 30 which has its lower end bearing against the marginal edge of the socket 25 and which has permanently secured to its upper end an annular spring receiving collar 32 surrounding the tubular member 26 and permanently supported on the tubular member 30.

A tubular member 35 having an outside diameter slightly less than the internal diameter of the tubular member 16 is arranged in telescoping relation thereto and carries at its upper end a cup-shaped cap 36 preferably welded thereto and providing a seat for the head of an anchor bolt 37. The frame portion of the vehicle to which the upper end of the shock strut is adapted to be secured is provided with a similar oppositely presenting cup-shaped cap member 39 which has a central aperture permitting the passing of the bolt 37. An annulus 40 of resilient material, such for example as rubber, surrounds the bolt 37 and is seated between the two facing cup-shaped members 36 and 39. It will therefore be apparent that when the bolt 37 is tightened, the upper end of the tubular member 35 will be resiliently mounted with respect to the frame 38 and will extend downwardly in telescoping relation with the tubular member 26 which, as has been explained above, is anchored in the socket 25 of the forging 17. Secured concentrically to the tubular member 35 and spaced therefrom is an annular collar member 41 which has welded to the lower end thereof an annular spring receiving collar 42 which serves to receive the upper end of a compression coil spring 43. The coil spring 43 is sufficiently large in diameter to surround the tubular members 35 and 26, as well as the resilient stop member 28. The lower end of this spring element is preferably seated in the spring receiving collar 32 carried by the tubular member 30 and described above.

The upper end of the tubular member 26 is preferably recessed to provide space for receiving annular packing 45 which will serve to effect a sealing engagement between the tubular member 26 and the inner tubular member 35. This packing 45 may be retained in place by means of the collar 27 mounted on the upper end of the tubular member 26.

Throughout the area in which the tubular members 26 and 35 are arranged in telescoping relation, suitable means are carried by one of these members to provide for relatively frictionfree longitudinal movement thereof. While any suitable anti-friction devices may be interposed between the telescoping portions of these tubular members, it has been found preferable to provide a plurality of rollers carried by one of the members and serving to engage the adjacent surface of the other. By way of illustration, Figures 4 to 6, inclusive, of the drawings show one form of anti-friction means which has been found particularly satisfactory for providing relatively friction-free longitudinal movement of these tubular members with respect to each other. Arranged one above the other in the inner tubular member 35 are a plurality of diametrically disposed shafts 50 which may be permanently secured to the inner tubular member 35 or may be journaled therein, as may be desired. In any event, however, it is desirable that these shafts 50 have their ends formed of a curvature lying substantially in the outer surface of the inner tubular member 35 in order to avoid any undue abrasion of the inner surface of the adjacent tubular member 26. These shafts are preferably arranged in crossed axes relation to one another, in order to provide maximum friction-free mountings of the tubular members with respect to each other. While any one of a number of suitable arrangements will accomplish this desired result, I prefer to arrange these shafts so that the axis of one roller is at about 90 degrees with respect to the axis of the adjacent rollers on either side thereof.

Each of these shafts has in its axial central portion, and preferably permanently secured thereto, the inner member of a raceway 51 which has a peripheral groove therearound adapted to receive a plurality of ball bearings 52 which are confined by a groove in the inner periphery of a roller 53. The roller 53 is preferably diametrically arranged with respect to the tubular member 35 and has an outer periphery adapted to engage the inner surface of the tubular member 26. The roller 53 is preferably of an outside diameter very slightly less than the internal diameter of the tubular member 26 in order that it will serve to maintain the tubular members 35 and 26 in proper axial alignment at all times and provide for relatively friction-free longitudinal movement of these two members with respect to each other.

While any suitable number of these roller elements may be mounted within the tubular member 35 throughout the area which it engages the inner surface of the tubular member 26, there are illustrated in Fig. 4 of the drawings four of these elements mounted for rotation on axes arranged at 90 degree angles with respect to each other, the lower roller and the roller next to the top being arranged to rotate on axes of rotation lying in the same plane, and the top roller and the roller next to the bottom being arranged to rotate on axes substantially at right angles to this plane.

From the foregoing it will be appreciated that when the shock strut construction of the present invention is subjected to bending stresses such as are inherent in its normal operation, due to its mounting, the friction-free mounting of the telescoping tubular member due to the presence of the rollers therein, will serve to facilitate longitudinal movement of these members with respect to each other, irrespective of the bending stresses to which the strut as a whole may be subjected.

It will be appreciated that the compression spring 43 carried by the members serves to resiliently control longitudinal movement of these members with respect to each other and serves to prevent shocks transmitted to the wheel 21 from being transmitted to the frame of the automobile.

Further, it will be apparent that the frusto-conical resilient stop member 28 will serve, when the members have been telescoped a predetermined amount, to provide resilient means to limit the telescoping movement of the members to a predetermined maximum. It will be seen that, upon telescoping the tubular members 26 and 35, the upper annular end of the resilient element 28 will enter the annular recess between the collar 41 and the tubular member 35, thus providing a positive yet substantially resilient limit of predetermined telescoping movement of these members.

Further, it will be appreciated that the resilient mounting of the upper tubular member 35 with respect to the frame, permits of accurate alignment of the tubular members with respect to each other. Further, it will be seen that the axis of the shock strut as a whole is arranged preferably substantially tangential to the arc of the circle about which the axle member 12 and radius rod 15 swing, in order to reduce the bending stresses to which the strut as a whole is subjected to a minimum.

It will further be appreciated that the specific embodiment and application of the shock strut element herein illustrated and described is merely illustrative of one form which the generic inventive concept presented may take. Many and other further modifications falling within the scope of the subjoined claims will be apparent to those skilled in the art.

What is claimed is:

1. A shock strut comprising a pair of tubular members adapted to be arranged in telescoping relation, rollers carried by one of said members adapted to engage the surface of the other of said members to provide for friction-free relative longitudinal movement of said members, one of said rollers being arranged on an axis at right angles to another of said rollers, said rollers being of a diameter slightly less than the diameter of the member which they are adapted to engage.

2. A shock strut comprising a pair of cylindrical members arranged in telescoping relation, a plurality of rollers arranged internally of the inner of said members, the diameter of said rollers being slightly greater than said inner member and slightly less than the internal diameter of said outer member.

3. A shock strut comprising a pair of cylindrical members arranged in telescoping relation, rollers diametrically arranged in the inner of said cylindrical members adapted to engage the inner surface of the outer of said cylindrical members, the axis of some of the rollers being transverse to the axis of other of said rollers.

4. A shock strut comprising a pair of cylindrical members arranged in telescoping relation, a series of rollers diametrically disposed and journalled in the inner of said members, adapted to engage the inner surface of the outer of said members, adjacent rollers in said series having axes transverse to each other.

5. A shock strut for use in independent vehicle wheel suspensions comprising a pair of tubular members arranged in telescoping relation, the inner of said tubular members having a plurality of rollers journalled for rotation therein, said rollers having a diameter slightly less than the inside diameter of said outer tubular member and diametrically arranged with respect to said inner tubular member, the axis of one of said rollers being arranged transverse to the axis of another of said rollers.

6. A shock strut for use in independent vehicle wheel suspensions comprising a pair of tubular members arranged in telescoping relation, the inner of said tubular members having a plurality of rollers journalled for rotation therein, said rollers having a diameter greater than the outside diameter of said inner tubular member but less than the inside diameter of the outer tubular member, the peripheral surfaces of said rollers being complemental to the interior surface of said outer tubular member, the axis of one of said rollers being arranged transverse to the axis of another of said rollers.

7. A shock strut for use in independent vehicle wheel suspensions comprising inner and outer tubular cylindrical members arranged in telescoping relation, the inner of said tubular members having an outside diameter slightly less than the inside diameter of said outer tubular member, the inner tubular member having slots in diametrically opposite walls thereof, a roller having a diameter greater than the outside diameter of said inner tubular member journalled for rotation therein and having portions of its periphery projecting through said slots and adapted to engage the inner surface of said outer tubular member to provide for relatively friction-free telescoping movement of one of said members with respect to the other.

8. A shock strut for use in independent vehicle wheel suspensions comprising inner and outer tubular cylindrical members arranged in telescoping relation, the inner of said tubular members having an outside diameter slightly less than the inside diameter of the outer tubular member, the inner tubular member having pairs of slots in the wall thereof, one slot of each pair being on the diametrically opposite wall from the other slot of said pair, rollers journalled for rotation in said inner tubular member, said rollers being of a diameter greater than the outside diameter of said inner tubular member and having portions of the peripheral surfaces thereof projecting through said slots and adapted to engage the inner surface of said outer tubular member, the axis of one of said rollers being arranged transverse to the axis of another of said rollers.

FRANK M. SMITH.